United States Patent
Srivastava et al.

(10) Patent No.: US 12,455,964 B2
(45) Date of Patent: Oct. 28, 2025

(54) KILL CHAIN IDENTIFICATIONS

(71) Applicant: Hewlett-Packard Development Company, L.P., Spring, TX (US)

(72) Inventors: Vivek Srivastava, Cambridgeshire (GB); Tobias Edward Sebastian Gray, Cambridgeshire (GB); Ratnesh Kumar Pandey, Cambridgeshire (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 59 days.

(21) Appl. No.: 18/560,807

(22) PCT Filed: Jul. 23, 2021

(86) PCT No.: PCT/US2021/042897
§ 371 (c)(1),
(2) Date: Nov. 14, 2023

(87) PCT Pub. No.: WO2023/003565
PCT Pub. Date: Jan. 26, 2023

(65) Prior Publication Data
US 2024/0289452 A1 Aug. 29, 2024

(51) Int. Cl.
*G06F 21/53* (2013.01)
*G06F 9/455* (2018.01)
*G06F 21/56* (2013.01)

(52) U.S. Cl.
CPC .......... *G06F 21/56* (2013.01); *G06F 9/45558* (2013.01); *G06F 2009/45587* (2013.01); *G06F 2221/034* (2013.01)

(58) Field of Classification Search
None
See application file for complete search history.

(56) References Cited

U.S. PATENT DOCUMENTS 9,197,653 B2 11/2015 Kruglick
10,284,574 B1 5/2019 Aziz et al.
(Continued)

FOREIGN PATENT DOCUMENTS

| CN | 102122330 A | 7/2011 |
|---|---|---|
| CN | 102254111 A | 11/2011 |
| RU | 2568282 C2 | 11/2015 |

*Primary Examiner* — Fatoumata Traore
(74) *Attorney, Agent, or Firm* — Quarles & Brady LLP

(57) ABSTRACT

An example storage medium stores instructions that, when executed, cause a processor of a computing device to receive an indication associated with a first virtual machine, the first virtual machine containing a first application, the indication indicating that a first operation in the first virtual machine is to use a second application; receive information associated with a second virtual machine, the second virtual machine created in response to the first operation and containing the second application; store information describing a chain of virtual machines, the chain of virtual machines including the first and second virtual machines, the stored information including a relationship between the first virtual machine and the second virtual machine, based on the received indication and the received information; and in response to an identification of malware in the chain of virtual machines, identify a particular virtual machine in the chain of virtual machines that is in a kill chain of the malware based on the stored information.

11 Claims, 5 Drawing Sheets

(56) References Cited

U.S. PATENT DOCUMENTS

| | | | |
|---|---|---|---|
| 10,320,813 B1 | 6/2019 | Ahmed et al. | |
| 2009/0241192 A1* | 9/2009 | Thomas | G06F 9/5077 718/1 |
| 2011/0019531 A1 | 1/2011 | Kim et al. | |
| 2014/0337836 A1* | 11/2014 | Ismael | H04L 63/145 718/1 |
| 2016/0241573 A1* | 8/2016 | Mixer | G06F 21/53 |
| 2017/0063898 A1 | 3/2017 | Muddu et al. | |
| 2020/0012781 A1* | 1/2020 | Liu | G06F 21/563 |
| 2021/0382743 A1* | 12/2021 | Kaufman | G06F 9/44505 |

* cited by examiner

KILL CHAIN IDENTIFICATIONS

BACKGROUND

Malicious files can damage, disrupt or gain unauthorized access to a computer system. Examples of malicious files include computer viruses, worms, Trojan horses, spyware, adware, ransomware, etc. Anti-malware software, such as anti-virus software, may detect malicious files.

BRIEF DESCRIPTION OF THE DRAWINGS

Examples are further described hereinafter with reference to the accompanying drawings, in which.

DETAILED DESCRIPTION

Figure 1:
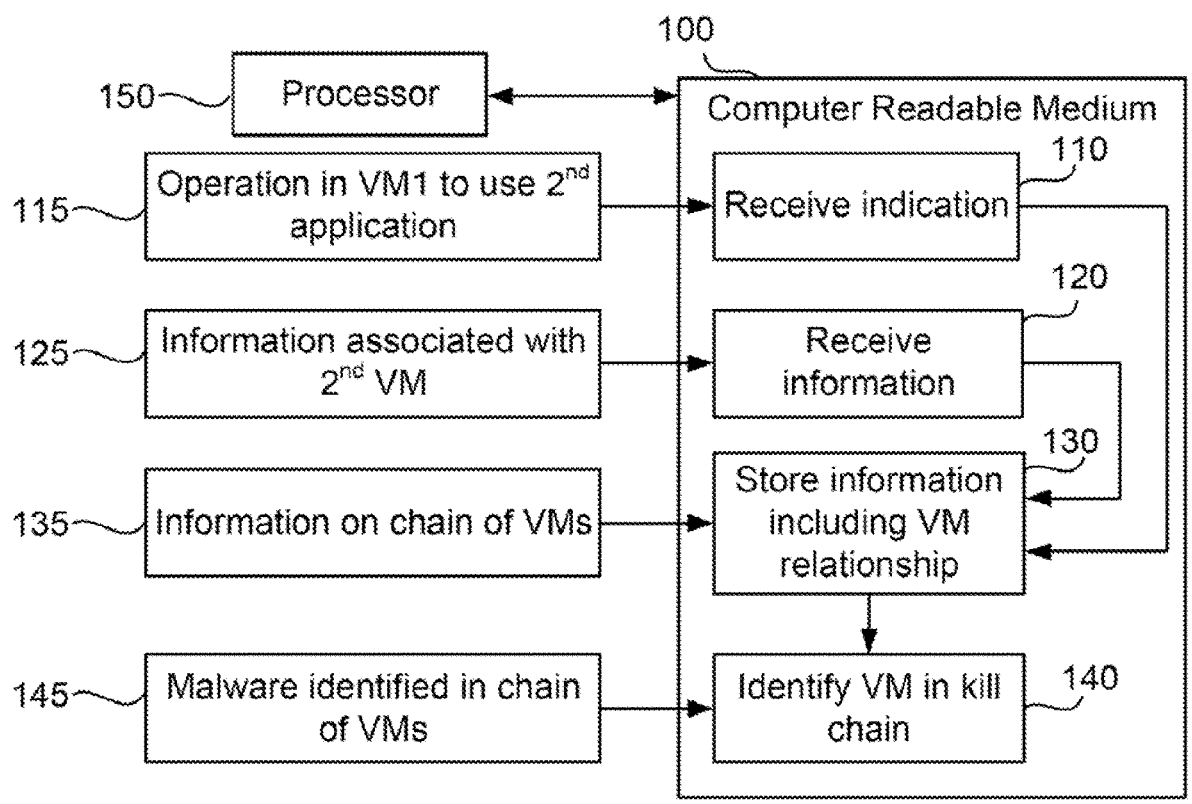
FIG. 1 shows an example schematic representation of a computer-readable storage medium storing instructions to cause storage of information describing a chain of virtual machines.

Anti-malware or anti-virus code may detect potentially malicious files using various methods. For example, files may be checked for signatures of known malware. In other examples, potentially malicious behavior may be detected. In some examples Heuristic analysis may be used to analyze the structure, etc. of the file to assess whether the file is potentially malicious.

In some cases, a malicious file will not have any negative effect on a computer system until the file is processed (e.g. control is transferred to the file). Examples of processing a file include opening, executing or interpreting the file. Executing may include, for example, executing an executable file, a dynamic-link library (DLL) file, or a plug-in. Interpreting a file may include parsing, interpreting, or rendering an image, a web page, a document file, a spreadsheet file, etc. Allowing the malicious file to remain on the computer system in a state that permits processing of the file risks such processing occurring, e.g. by a user unintentionally or unwittingly attempting to access the file, or by an automated process (such as thumbnail generation). Identification of a file as malicious may allow action to be taken to reduce the risk of the file being processed, such as warning a user, quarantining the file, deleting the file, etc.

In some cases malware may be processed when browser software (e.g. a web browser) accesses a malicious webpage or website. For example, a malicious website may attempt to initiate download and installation of malware. Detection of malicious behavior by a website may lead to a Uniform Resource Locator (URL) associated with the website being identified as malicious. Identifying a URL as malicious allows action to be taken to reduce the risk presented by the URL. For example, the URL may be blocked, such that the computer system is prevented from accessing the URL.

According to some examples, a virtual machine (VM) may be used to interact with a potentially malicious file or URL, e.g. by processing the potentially malicious file within the VM. The VM may use hardware isolation to prevent changes made in the VM from affecting the host system. Any changes in the VM may be discarded when the VM is shut down, preventing, or reducing the risk of, any malware present in the potentially malicious file or URL affecting the host system. Examples may make use of a traditional VM or a microVM, for example. A microVM may offer lower latency and use fewer system resources than a traditional VM. A VM may be managed by a VM manager (VMM), a hypervisor, or a microvisor, for example. In some examples, the VMM may be classified as Type 1 or Type 2. Type 1 refers to a VMM that executes directly upon the hardware of the system and is the most privileged software component within the system. Type 2 refers to a VMM that executes within a host operating system, and in that case the VMM may have a lower privilege than the host operating system. The type of VM used in examples herein is not particularly limited.

In some malware attacks an originating malicious file or URL (an infection source) may initiate chain of events that result in the download or processing of malicious content, such that the originating file or URL does not directly perform any malicious act. The chain of events intended by an attacker to lead to processing of malicious content may be referred to as a kill chain.

For example, an email may have a PDF (Portable Document Format) document attachment, and the PDF document may include a malicious URL embedded within an image. When a user clicks within the PDF document, it may redirect to the malicious target URL to cause download of a malicious payload. This process may involve the following transitions:

1. The PDF file is obtained from the mail server. An automated check of the PDF file may determine that it is not malicious. As user activity is needed to initiate the download of the malicious payload there is no evidence within the PDF file itself to indicate its malicious nature.
2. A new (first) VM may be instantiated to safely open the pdf document. Even though the PDF file is not evidently malicious it may still be treated as untrusted, and so opened in a VM to protect the host computing system.
3. In response to the request, in the first VM, to access a URL, a separate (second) VM may be instantiated to handle the request. As a result, the payload may be downloaded into the second VM.
4. The payload may be opened in a further separate (third) VM. The payload may be opened in response to a user input, or may be opened automatically (e.g. for background analysis of the payload).

As the payload may be opened or analyzed in a VM, it may be prevented from damaging the computer system, and may also be detected as malicious within the VM. However, the multiple stages of the attack attempt to obfuscate the origin or source of the attack: the PDF file in this example. If the origin of the attack is not detected a user may designate the origin as a trusted file, for example. That may lead to subsequent processing of the origin file outside of a VM. In the example above, this may allow processing of the malicious payload on the host computing system. Similarly, if the origin of the attack is not detected a user may share the origin file with other users, increasing the likelihood of insecure processing of the malicious payload.

Some examples allow a kill chain to be determined in response to detection of malicious content. This may facilitate understanding the root cause (e.g. originating malicious file or URL) of the malicious content. In some examples, the determined kill chain may be used in an automatic response to the detected malicious content.

FIG. 1 shows an example schematic representation of a computer-readable storage medium 100 storing instructions. In some examples the instructions cause a host-side process to be performed, a VM-side process to be performed, or both. The host-side process is a process on the host computer and the VM-side process is a process executing within the VM.

The instructions cause a processor of a computing device to receive 110 an indication 115 associated with a first VM, the first VM containing a first application, the indication indicating that a first operation in the first VM is to use a second application. For example, in the example above the first VM may be a VM to open the PDF document. In that case the first VM may include an application for viewing PDF documents. If a user clicks a link in the PDF document, for example, use of a browser (second application) may be requested to perform the requested action (accessing the URL). The VMs may be application-specific and so may transfer control to another application via transition to a new VM.

The instructions further cause the processor to receive 120 information 125 associated with a second VM, the second VM created in response to the first operation and containing the second application. For example, in the example above the second VM may be a VM to launch a browser to access the URL in the PDF document.

The instructions further cause the processor 150 to store 130 information 135 describing a chain of VMs, the chain of VMs including the first and second VMs, the stored information including a relationship between the first VM and the second VM, based on the received indication and the received information. For example, the stored information may indicate that the second VM is a child VM of the first VM. Here, when a second VM is initiated or instantiated in response to an operation in a first VM, the first VM may be considered to be the parent of the second VM and the second VM may be considered to be a child of the first VM. In the example above, the first VM (to open the PDF document) may be a parent VM of the second VM (to access the URL). The second VM may, in turn, be a parent VM of the third VM (to process the payload).

A parent VM of a particular VM may be referred to as an ancestor VM. Further, any parent VM of an ancestor VM of the particular VM may also be an ancestor VM of the particular VM. A child VM of a particular VM may be considered to be a descendent VM of the particular VM. Further, any child VM of a descendent VM of the particular VM may also be a descendent VM of the particular VM.

The instructions further cause the processor 150 to, in response to an identification 145 of malware in the chain of VMs, identify 140, based on the stored information, a particular VM in the chain of VMs that is in a kill chain of the malware. For example, the stored information may include relationships, such as parent/child information for each of the VMs in the chain of VMs. In the example above, a determination that the third VM is malicious (e.g. includes malicious code) due to the presence of the malicious payload, may lead to the ancestor VMs of the third VM (i.e. the second VM and first VM) also being identified as malicious (e.g. being identified as including malicious code).

The first VM may be a primary VM. Primary VM may refer to a VM that does not have a parent VM, such as an initial VM in a chain of VMs. For example, an attempted file or URL access in the host system may lead to the instantiation of a primary VM in order to access the file or URL securely. Other VMs in a chain of VMs may be secondary VMs. A secondary VM may be created in response to an operation in a VM (e.g. an attempt to access a file or URL from within a VM), such that the secondary VM is created in response to an operation in a respective preceding VM in the chain of VMs. Thus, a VM that has a parent VM may be a secondary VM. The stored information may store information on a relationship between a secondary VM and a respective preceding VM.

Figure 2:
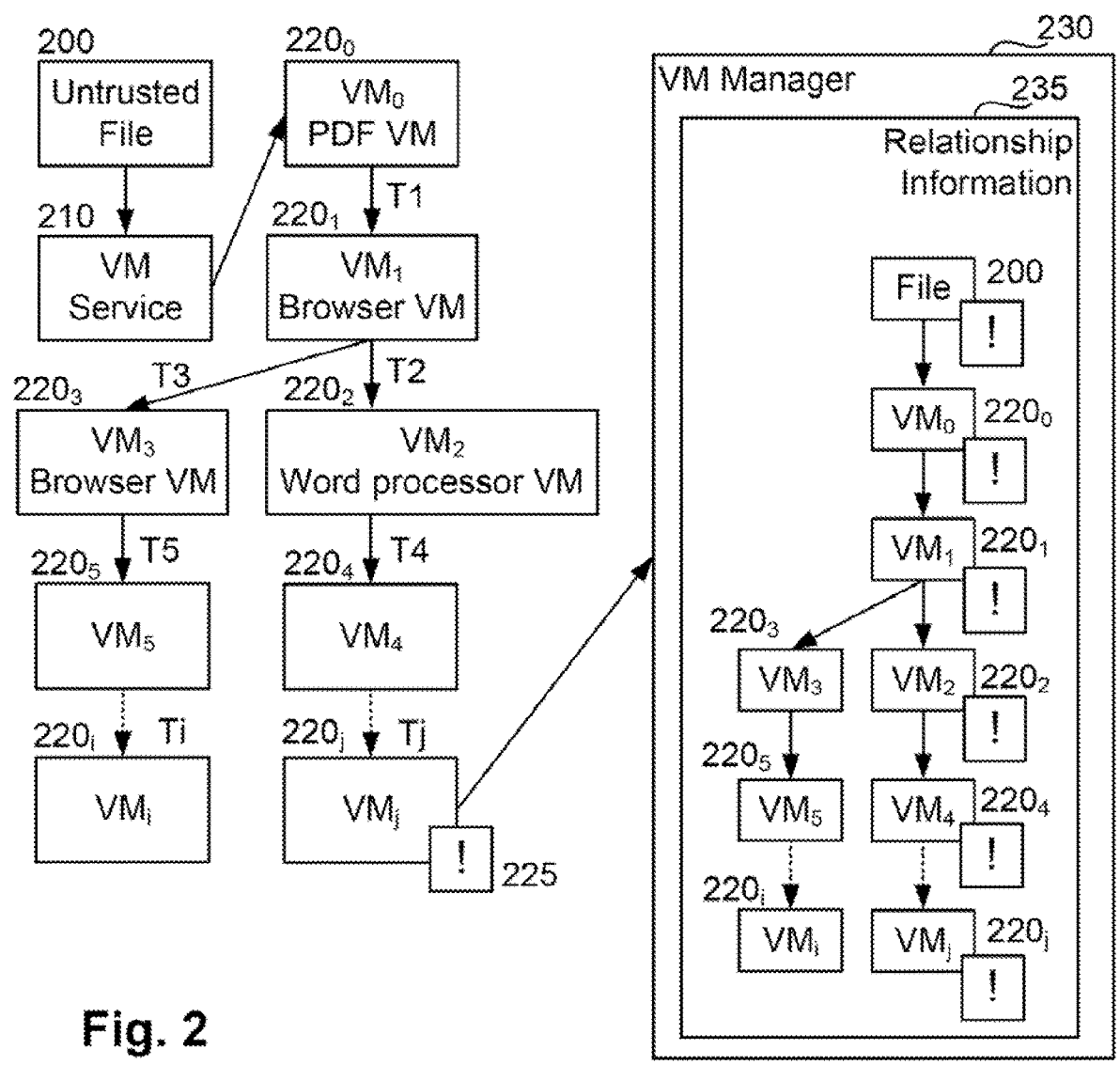
FIG. 2 shows an example of stored information describing a chain of virtual machines.

FIG. 2 shows an example of stored information describing a chain of VMs and using the stored information to respond to an identification of malware in one of the VMs.

A file 200 may be opened, e.g. by a user. The file may be designated as an untrusted file. Processing of files designated as untrusted may be prevented outside of a VM. In some examples other designations may be used, or a user may request processing of the file in a VM without the file being designated as untrusted. In other examples all files may be processed in a VM. FIG. 2 shows an example of accessing a file 200, but similar processing may apply to accessing a URL. The untrusted file may be passed to a VM service 210 of the computing device. The VM service may include software for securely accessing files and URLs in VMs. The VM service may include various components in user space and kernel space of the host system and in user space and kernel space of the VMs.

In the example of FIG. 2 the file 200 is a PDF file and so the VM service 210 may pass the file 200 to a first VM, $VM_0$ $220_0$, that includes software for processing a PDF file. The VM service 210 may initiate or instantiate $VM_0$ $220_0$ in response to receiving a request to process file 200.

In the example of FIG. 2, processing the PDF may result in a request to use a browser. The PDF file may include a URL, for example. $VM_0$ $220_0$ may cause, or request, instantiation of a VM with browser functionality, $VM_1$ $220_1$. In some examples the VMs may be application specific, such that a bowser may be unavailable in $VM_0$ $220_0$. In some examples, a for the VM service 210 to instantiate a further VM may originate from an existing VM. In some examples the request may be initiated by a component of the VM service 210 executing within the requesting VM. In the example of FIG. 2 $VM_1$ $220_1$ is instantiated and the URL from the PDF file 200 may be passed to $VM_1$ $220_1$. The processing may transition, via transition T1, to $VM_1$ $220_1$.

A VM manager 230 may store relationship information 235 describing relationships between VMs, e.g. by recording that $VM_1$ $220_1$ is a child of $VM_0$ $220_0$, that $VM_0$ $220_0$ is a parent of $VM_1$ $220_1$, or both. The VM manager may also store information indicating that file 200 caused the instantiation of the first VM $VM_0$ $220_0$. The VM manager may be included in the VM service or may be separate. The relationship information 235 may correspond with the information 135 describing a chain of VMs of FIG. 1.

In the Example of FIG. 2, the destination of the URL (e.g. a webpage or ftp server) may cause the download of a file, such as a document in a word processor format. A further VM, $VM_2$ $220_2$ may be instantiated, via transition T2, to access the document. In some examples, word processor functionality may be absent in $VM_1$ $220_1$.

The user may click a link in $VM_1$ $220_1$, causing a new browser VM, $VM_3$ $220_3$, to be created in transition T3 in order to access the destination of the clicked link. In this example, $VM_2$ $220_2$ and $VM_3$ $220_3$ are both children of $VM_1$ $220_1$, and $VM_1$ $220_1$ is the parent of each of $VM_2$ $220_2$ and $VM_3$ $220_3$.

Further operations in $VM_2$ $220_2$ and $VM_3$ $220_3$, may lead to respective child VMs $VM_4$ $220_4$ and $VM_5$ $220_5$ being instantiated via transitions T4 and T5. Further VMs may be instantiated due to operations in $VM_4$ $220_4$ and $VM_5$ $220_5$. In the Example of FIG. 2, $VM_1$ $220_1$ is a descendent of $VM_5$ $220_5$, possibly via other VMs, and $VM_j$ $220_j$, is a descendent of $VM_4$ $220_4$, possibly via other VMs. FIG. 2 is merely one example, and other arrangements of VMs are possible.

As each VM is requested or instantiated the VM manager may receive information describing the new VM or a relationship between the new VM its parent VM (e.g. an identifier of the new VM and an identifier of a VM that requested the instantiation of the new VM). The VM manager may store the relationship information 235.

In the example of FIG. 2 an operation or file in $VM_j$ $220_j$ may be determined to be malicious and in response $VM_j$ $220_j$ may be marked 225 as malicious. Herein, marking a VM malicious may include setting a flag associated with the VM to indicate that the VM is malicious. In addition, or alternatively, marking a VM malicious may include marking a file or URL associated with the VM as malicious. The file or URL associated with the VM may be the file or URL that was accessed to cause the instantiation of the VM or may be a file or URL accessed within the VM. In some examples multiple files or URLs in a VM may be marked as malicious when a VM is determined to be malicious.

In some examples, in response to the determination that a VM is malicious, a kill chain may be determined based on the relationship information 235.

In some examples, in response to $VM_j$ $220_j$ being marked malicious, the VM manager may mark the parent VM of $VM_j$ $220_j$ malicious. In response to the parent VM being marked malicious, it's parent may, in turn, be marked malicious, etc. This may be carried out iteratively or recursively, for example. In some examples all ancestor VMs of a malicious VM may be marked as malicious. In some examples all VMs in a direct chain between the malicious VM, $VM_j$ $220_j$, and the first VM $220_0$ may be marked malicious.

In the example of FIG. 2, in response to $VM_j$ being determined to be malicious, each of $VM_4$ $220_4$. $VM_2$ $220_2$, $VM_1$ $220_1$ and $VM_0$ $220_0$ may be marked malicious (as well as any VMs in the direct chain between $VM_4$ $220_4$ and $VM_j$ $220_j$. In some examples, in response to $VM_0$ $220_0$ being marked as malicious, file 200 may be marked as malicious. In some examples, files or URLs associated with VMs marked as malicious may also be marked as malicious. For example, the URL opened in $VM_1$ $200_1$ and the word processing document opened in $VM_2$ $200_2$ may both be marked as malicious. A user may be prevented from carrying out certain operations on a file that has been marked as malicious. For example, the user may be prevented from marking a file as safe, opening the file, opening the file outside of a VM, sharing or distributing the file, or any combination of these. In some examples, an administrator may be permitted to carry out an action on a malicious file that a user is prevented from performing.

In the example of FIG. 2, $VM_3$ $220_3$ and its descendants ($VM_5$ $220_5$ ... $VM_i$ $220_i$) are not ancestors of $VM_j$ $220_j$, and so their malicious/not malicious state may be unaffected by the determination that $VM_j$ $220_j$ is malicious (i.e. if they are not marked as malicious they may remain so). This may assist in avoiding over flagging of VMs as malicious. For example, the URL in $VM_1$ $200_1$ may be malicious, and may point to a webpage that includes a link that, when clicked, leads to the processing in $VM_4$ $220_4$, and ultimately to the malware in $VM_j$ $220_j$. However, the webpage in $VM_1$ $200_1$ may also include links to legitimate web-sites. The user may click on one of these legitimate links, which is opened in $VM_3$ $200_3$. The files and URLs opened in $VM_3$ $220_3$ are not part of the kill chain leading to $VM_j$ $220_j$. Accordingly, the VM manager may be arranged such that a child VM is not inferred to be malicious in response to its parent VM being marked malicious.

In the example of FIG. 2, storing the relationship information 235 may allow a kill chain of the malicious element in $VM_j$ $220_j$ to be determined or studied. In the absence of relationship information 235 it may be difficult to determine the kill chain. In the example of FIG. 2 the kill chain includes file 200, $VM_0$ $220_0$, $VM_1$ $220_1$, $VM_2$ $220_2$, $VM_4$ $220_4$ ... $VM_j$ $220_j$.

In some examples, automatically marking VMs in the kill chain as malicious may permit a rapid response to detected malicious activity without a user or administrator intervention. In some examples, automatically marking the originating file 200 as malicious when its associated VM, $VM_0$ $220_0$, is determined to be malicious may improve the security of the computing system, e.g. by preventing certain types of processing of the file 200.

In the example above, the determination of the kill chain was based on parent/child relationships between the VMs. However, in some examples alternative or additional information about relationships between the VMs may be included in the relationship information 235 and may be used in determining the kill chain. For example, if a transition from one VM to another VM, events across the VMs may be correlated and malware manifests may be gathered.

In some examples of the arrangement of FIG. 1. malware may be identified in the VM in the chain of VMs and in response to the identification of the malware in the VM, the VM may be flagged as malicious. When a secondary VM is flagged as malicious, it may be determined that its respective preceding VM is in the kill chain of the malware, and that preceding VM may be flagged as malicious. This may assist in identifying VMs, files. URLs, etc. in the kill chain of the malware.

In some examples, when a particular secondary VM is not flagged as malicious, the particular secondary VM is not then flagged as malicious in response to its respective preceding VM being flagged as malicious. For example, if a particular VM's parent VM is determined to be malicious, the particular VM's status (malicious/not malicious) may remain unchanged in response to the determination that the parent VM is malicious.

In some examples a file or URL opened in the primary VM may be identified, and the identified file or URL may be identified as malicious. This may assist in identifying an original source file or URL in a kill chain, which may be the root cause of the detected malware.

In some examples, the stored information may include: identifiers for the VMs, behavior data, snapshots of the VMs, information on file system access by the VMs, information on registry access by VMs, memory contents of the VMs, screen captures of the VMs, or a combination thereof.

Figure 3:
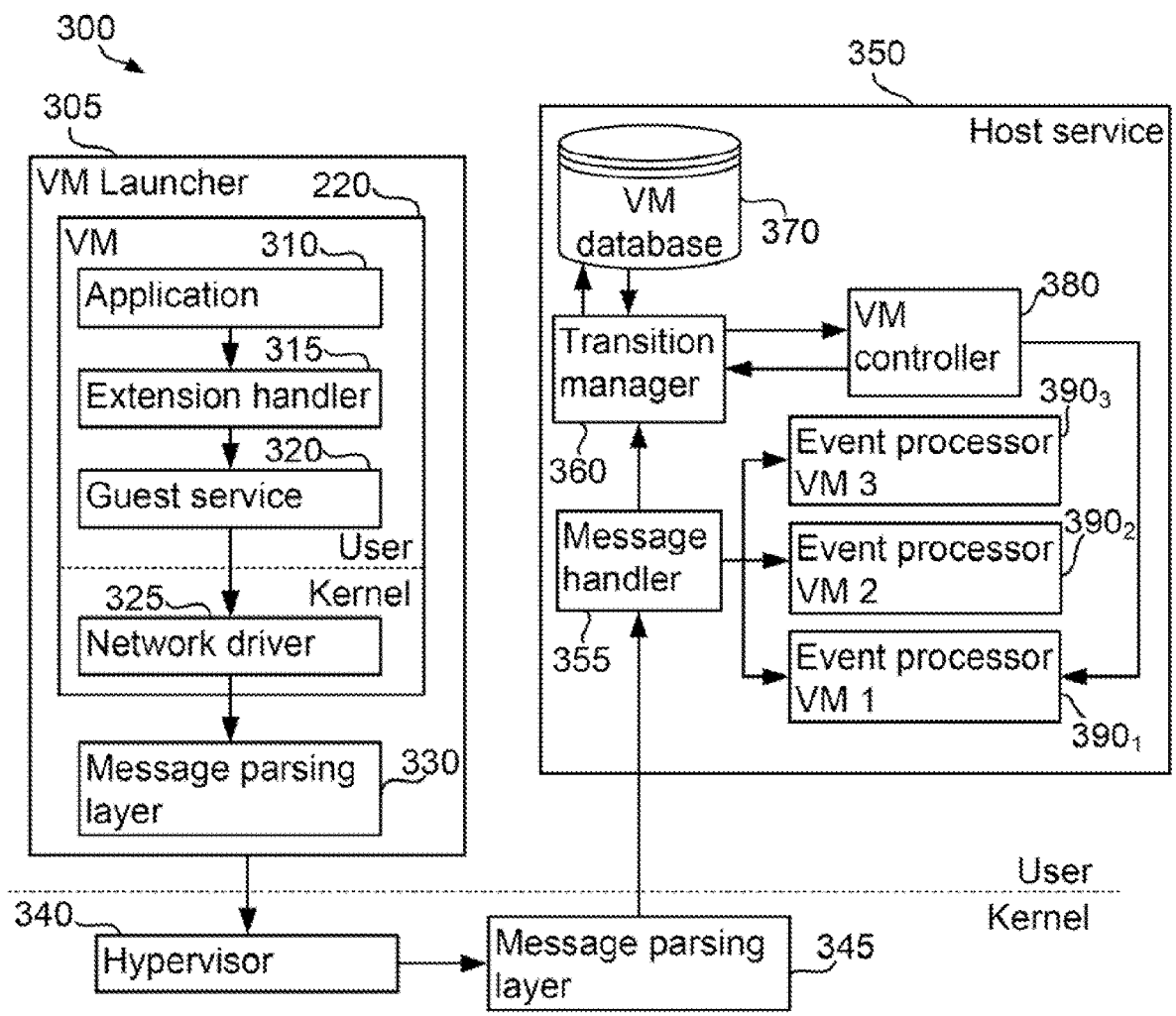
FIG. 3 shows an example architecture having a transition manager and a virtual machine database.

FIG. 3 shows an example architecture 300 according to some examples. In response to a request to open a file or URL a VM 220 may be instantiated by a VM launcher 305. The VM 220 may include application software 310 (such as document processing software or browser software) to open the file or URL. The file or URL may cause the application software 310 to attempt to open a further file or URL. The further file or URL may be passed to an extension handler 315 that is arranged to request instantiation of a further VM to open the further file or URL. For example, the extension handler 315 may be registered in the VM 220 as the default http/https handler, such that the extension handler 315 is executed in response to a URL being clicked. The extension handler 315 may notify a VM guest service 320 of the request to open a file or URL. The VM guest service 320 may send a message to a hypervisor 340 running on the host operating system via a network driver 325 of the VM 220 and a message parsing layer 330 of the VM launcher 305. The message may request the file or URL be opened securely in a separate (i.e. a further) VM.

In another example, a browser plugin may be installed in a browser in the VM 220. When a file downloaded by the browser is accessed (e.g. by a user clicking run following download of an executable file) the plugin may cause a message to be passed to the hypervisor 340 to request the file be opened in a new VM.

In the example architecture of FIG. 3, the application 310, extension handler 315 and guest service 320 may execute in a user space of the VM 220. The network driver 325 may execute in a kernel space of the VM 220. The VM launcher 305 and VM 220 may execute in a user space of the host computing system. The hypervisor 340 may execute in a kernel space of the host computing system.

A host service 350 may execute in the user space of the host computing system. The host service may include a transition manager 360 for receiving a notification from the hypervisor 340 when a transition takes place, where a transition includes the instantiation of a new VM in response to a request from an executing VM. For example, the transition manager 360 may receive a notification from the hypervisor 340 indicating that the further VM is to be instantiated in response to the attempt to open a file or URL in VM 220.

The hypervisor 340 may communicate with the transition manager 360 via a message parsing layer 345 and a message handler 355. The message parsing layer 345 may execute in the kernel space of the host computing system and the message parsing layer 345 be included in the host service 350. The hypervisor 340 may communicate with the transition manager 360 via an inter-process communication (IPC) message.

In response to the notification from the hypervisor 340, the transition manager 360 may cause the requested new VM to be spawned or instantiated via a VM controller 380 of the host service 350.

In response to receipt of a notification of a transmission, the transition manager 360 may obtain information associated with the VM that is requesting instantiation of the new VM. For example, the transition manager 360 may obtain a record of the requesting VM from the notification message received from the hypervisor 340. The information associated with the VM may include an identifier of the VM. For example, the information associated with the VM may include a Globally Unique Identifier (GUID) of the VM. The transition manager 360 may also obtain information associated with the new VM. In some examples, when a browser VM includes multiple tabs the identifier may uniquely identify each of the browser tabs, such that the identifier may be used to associate an event with the browser tab in which the event occurred. The identifier may be allocated by the host computing system when a VM, or a browser tab within a VM, is created. In these examples, some messages and notifications, etc. are described as communicated via the hypervisor 340. In other examples, other computer executable instructions (e.g. software, firmware, or a combination of these) distinct from a hypervisor may be used in place of the hypervisor to communicate some or all of these messages and notifications.

The transition manager 360 may store information relating to the requesting VM and the new VM. The information may be stored in a VM database 370. The information may include an identifier for the requesting VM, an identifier for the new VM, and a relationship between the requesting VM and the new VM. The relationship may describe a parent/child relationship between the requesting VM and the new VM. In some examples a record associated with the new VM may indicate the identifier of the requesting VM. In some examples a record of a child VM identifies its parent VM. The VM database 370 may correspond with the information 135 describing a chain of VMs of FIG. 1 or the relationship information 235 of FIG. 2.

In some examples the transition manager 360 may store in VM database 370 information describing events that occur in VMs. For example, the transition manager 360 may store a description of the event that caused the requesting VM to request instantiation of the new VM (e.g. a link clicked by a user, a file downloaded and clicked by a user, etc.)

In some examples the transition manager 360 may store in VM database 370 information describing file system access in the VM, files accessed in the VM, registry entries created in the VM, registry entries accessed in the VM, attempts by software in the VM to persist itself within the VM, or a combination of these. This information may assist in analyzing detected malware.

In some examples the transition manager 360 may store a screenshot of the VM. In some examples the screenshot may show the display contents at a time of an action that caused the VM to request a new VM be instantiated. In some examples the transition manager 360 may store a video of the screen in the VM. This information may assist in analyzing detected malware.

In some examples the transition manager 360 may store a snapshot of the VM. A snapshot may preserve the state and data of the VM. In some examples the snapshot may correspond to the time of an action that caused the VM to request a new VM be instantiated. This information may assist in analyzing detected malware.

The identifier of the requesting VM, events in the requesting VM, or both, may be communicated from the requesting VM 220 to the transition manager 360 via the hypervisor 340.

In some examples the transition manager 360 may be a correlation engine. The VM database 370 may be, or may include, a relationship database describing relationships between VMs. The VM database 370 may be, or may include, a transition database, describing transitions between VMs.

An event processor $390_1$-$390_3$ in the host service may be associated with a respective VM 220. The host service 350 may maintain multiple instances of event processors $390_1$-$390_3$ corresponding to the launch of respective VMs. The event processors $390_1$-$390_3$ may be responsible for processing and correlating events from the corresponding VMs against rule-engine heuristics to detect malicious behavior in the VMs. When a VM is found to be malicious by the event processor $390_1$-$390_3$, the event processor $390_1$-$390_3$ reports back to the VM controller. For example, an event processor (e.g. $390_3$) may report to the VM controller 380 that the VM associated with event processor (e.g. $390_3$) is malicious. In that case, the VM controller 380 may signal the transition manager 360 with an identifier of the malicious VM and the transition manager 360 may determine ancestor VMs of the identified VM (e.g. by backtracking parents relationships starting from the identified VM), and mark them malicious. The transition manager may associate VMs marked as malicious with logged events in those VMs for threat reporting.

When malware is detected in a VM, the VM database 370 may be queried to backtrack events leading to the deployment of the malware, and may allow the full kill chain of the malware to be determined.

In some examples, when a VM is closed (e.g. when an associated file or browser is closed) the information describing the closed VM may be retained in the VM database 370. In some examples the information describing the closed VM may be retained until all descendants of the VM have been closed. In some cases, the information describing the closed VM may be retained until all other VMs in the same family (i.e. all descendants of the VM, all ancestors of the VM and all descendants of all ancestors of the VM) are closed.

Retaining information relating to a closed VM may assist in determining a kill chain of a malicious file or URL that is detected after the VM is closed. For example, a malicious URL may cause the download of a file containing malware. The browser VM that accessed the malicious URL may be closed before the malicious file is executed. The file may subsequently be executed and determined to be malicious. Retaining information associated with the browser VM may permit analysis of events leading to the download of the malicious file.

Figure 4:
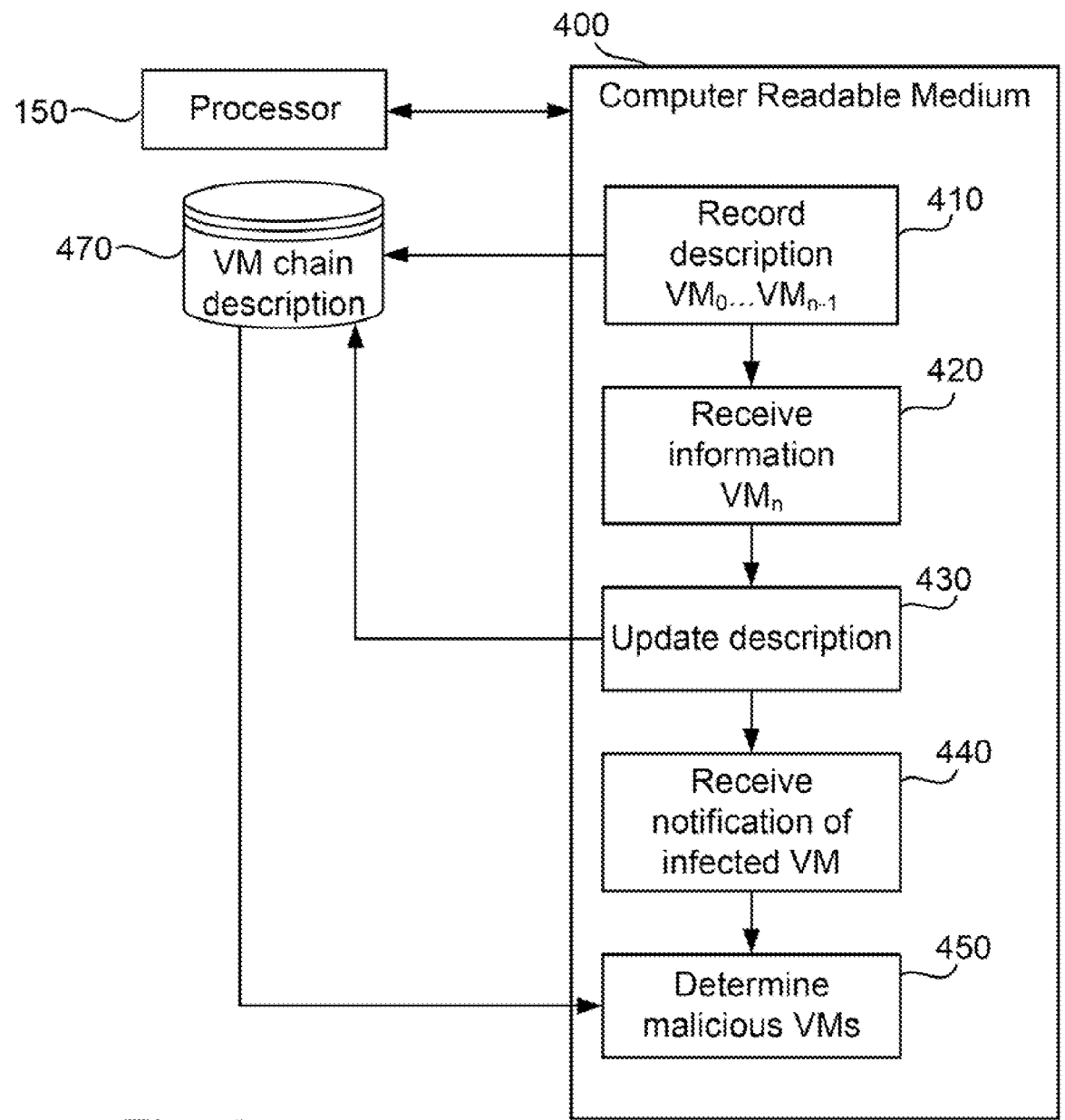
FIG. 4 shows an example schematic representation of a computer-readable storage medium storing instructions to record a description of a chain of virtual machines.

FIG. 4 shows an example schematic representation of a computer-readable storage medium 400 storing instructions. A processor 150 of a computing system may execute instructions stored by the storage medium 400.

The processor 150 may execute instructions to instantiate a child VM in response to an event in a respective parent VM. In some examples the VM may be used to securely access a file or URL. A starting VM may be instantiated to access a file or URL, where the request to access the file or URL does not arise within a VM (e.g. the request originates from an operation on the host computing system). As such, the starting VM may lack a parent VM. In some examples herein the starting VM may be referred to as $VM_0$.

Instructions 410 stored on the medium 400 cause the processor 150 to record a description 470 of a chain of VMs, the chain of VMs includes n VMs, the n VMs include a starting VM and n−1 child VMs. The child VMs may be indicated $VM_1 \ldots VM_{n-1}$. The child VMs are associated with a respective parent VM among the n VMs. The stored description 470 of the chain of VMs includes parent and child relationships between the VMs. For example, an identifier for a child VM may be linked, in the description, with an identifier of its parent VM.

The instructions 420 stored on the medium cause the processor 150 to receive information regarding a further child VM instantiated in response to an event in a VM of the n VMs. For example, a VM (e.g. $VM_i$) of the n VMs may request access to a file or URL, resulting in a new VM being spawned to perform the access. The new VM may be denoted $VM_n$.

The instructions 430 stored on the medium cause the processor 150 to update the description 470 of the chain of VMs to include the further child VM. For example, when $VM_n$ is spawned in response to a file or URL access in $VM_i$, information on $VM_n$ may be included in the description 470. The information on $VM_n$ may include an indication that $VM_i$ is its parent. Alternatively, or in addition, information on $VM_i$ in the description 470 may be updated to indicate that $VM_n$ is a child of $VM_i$.

The instructions 430 stored on the medium cause the processor 150 to receive a notification of an infected VM, where the infected VM is a VM in the chain of VMs that is identified as containing malware. For example, the processor may execute malware detection code in order to identify malware within the VMs. In response to a detection, a notification may be provided indicating the VM in which the malware was identified. Here, the VM identified as containing malware may be denoted $VM_j$.

The instructions 430 stored on the medium cause the processor 150 to determine other VMs in the chain of VMs to be identified as malicious based on the notification and based on the description 470 of the chain of VMs. The description of the chain of VMs may be used to identify other VMs in the kill chain leading to $VM_j$. This may include determining that ancestor VMs of VM, are malicious, for example.

In some examples, the event in a parent VM that causes the respective child VM to be instantiated may be a request to use an application that is not available in the parent VM but is available in the respective child VM. For example, the parent VM may be a browser VM (i.e. a VM including browser functionality) and a link is clicked causing a document to be downloaded and opened. Where the browser VM does not include an application suitable for opening the document a new VM may be spawned to open the document. In some examples each attempt in a particular VM to access a new file or URL may cause a new child VM to be instantiated, regardless of the availability of functionality for accessing the new URL or file in the particular VM.

In some examples the instructions stored on the medium 400 may cause the processor 150 to set an indication that the infected VM is malicious. For example a flag associated with the VM, or a file or URL within the VM, may be set to indicate that the VM, file or URL is malicious.

Determining other VMs in the chain of VMs to be identified as malicious may include setting respective indications that parent VMs in a direct chain linking the infected VM with the starting VM are malicious. This may be similar to the arrangement shown in FIG. 2.

In some examples, when a parent VM has a first child VM and a second child VM, and an indication that the first child VM is malicious is set, the indication that the parent VM is malicious may also be set, but the indication that the second child VM is malicious may remain not set. Accordingly, a determination that a parent VM is malicious does not imply that the child VM will be determined to be malicious. This may assist in avoiding false positives, or over identification of malicious VMs.

In some examples the instructions stored on the medium 400 may cause the processor 150 to identify a file or URL as malicious, wherein an access to the file or URL cased the instantiation of the starting VM in the chain of VMs. This may allow the first element in the kill chain to be identified as malicious, which may reduce the risk of a the first element in the kill chain being accessed again or being accessed insecurely. This, in turn, may reduce the risk of the malware being successfully deployed.

In some examples the instructions stored on the medium 400 may cause the processor 150 to maintain the record until all VMs in the chain of VMs are closed. This may allow the kill chain to be identified or analyzed when one or more VMs in the kill chain are closed before the identification of malware in a VM in the chain.

Figure 5:
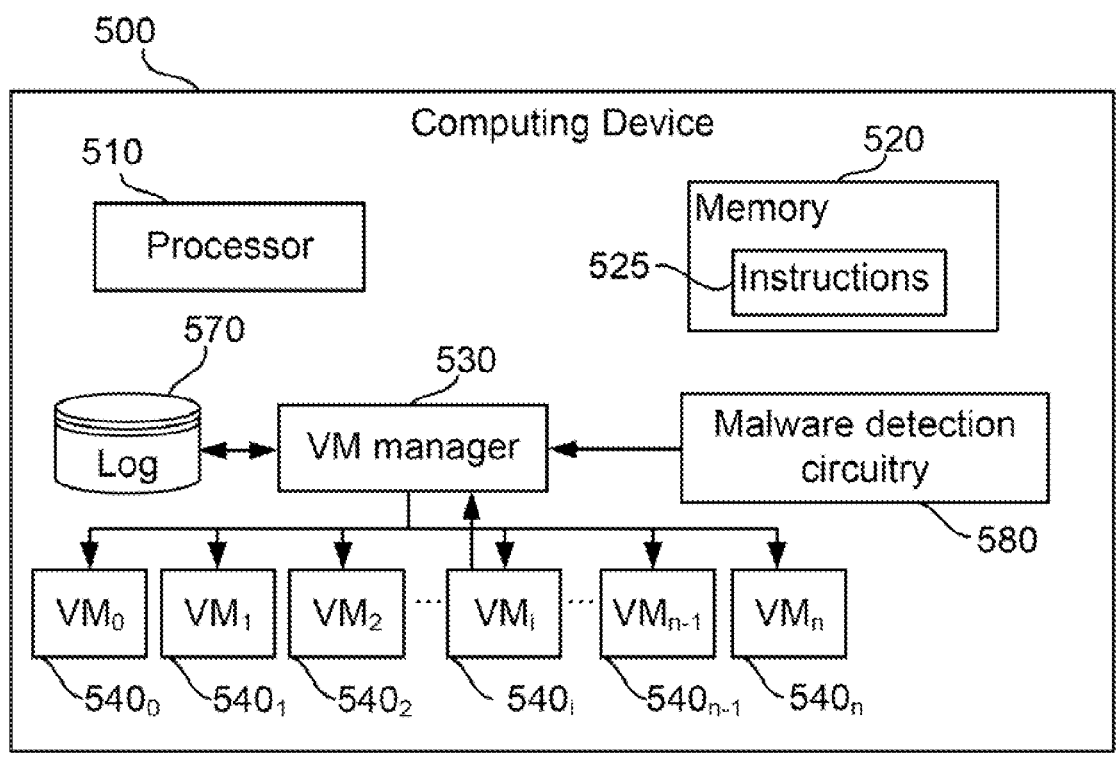
FIG. 5 shows an example schematic representation of a computing device arranged to log an association between virtual machines.

FIG. 5 shows an example schematic representation of a computing device 500.

The computing device 500 includes a processing device 510. The processing device 510 may be to execute instructions 525 stored in a memory 520.

The computing device 500 includes VM management circuitry 530 to instantiate and manage VMs $540_0 \ldots 540_{n-1}$.

The VM management circuitry 530 is to receive a notification from a VM (e.g. $VM_i$ $540_i$) when the $VM_i$ $540_i$ requests instantiation of a new VM $VM_n$ $540_n$. The new $VM_n$ $540_n$ may be requested or instantiated in response to a file or URL being accessed in the requesting $VM_i$ $540_i$.

The notification includes an identifier of the requesting $VM_i$ $540_i$. In response to receiving the notification, the VM management circuitry 530 is to log the identifier of the requesting $VM_i$ $540_i$, instantiate the new $VM_n$ $540_n$, log an identifier of the new $VM_n$ $540_n$, and log an association between the requesting $VM_i$ $540_i$ and the new $VM_n$ $540_n$. Logging identifiers may be carried out by writing the information to a log 570, such as a log file, database, etc., or otherwise storing the identifiers for later retrieval.

The VM management circuitry 530 is to receive an indication from malware detection circuitry 580 that the new $VM_n$ $540_n$ is malicious. In some examples the malware detection circuitry 580 may monitor the VMs $540_0$-$540_n$ to detect malware in the VMs $540_0$-$540_n$. For example, files may be checked for signatures of known malware. In other examples, potentially malicious behavior may be detected. In some examples Heuristic analysis may be used to analyze the structure, etc. of a file or URL to assess whether the file or URL is potentially malicious.

In response to the indication from the malware detection circuitry 580 that the new $VM_n$ $540_n$ is malicious, the VM management circuitry 530 is to mark the new $VM_n$ $540_n$ as malicious and also to mark the requesting $VM_i$ $540_i$ as malicious, based on the logged identifier of the $VM_i$ $540_i$, the logged identifier of the new $VM_n$ $540_n$, and the logged association. As $VM_i$ $540_i$ caused the instantiation of the malicious VM ($VM_n$ $540_n$), $VM_i$ $540_i$ may be considered part of the kill chain, and so also malicious. The log 570 may be accessed by the VM management circuitry 530 to identify a VM (e.g. $VM_i$ $540_i$) associated with a VM identified as malicious ($VM_n$ $540_n$) in order to mark the associated VM as malicious. For example, the associated $VM_i$ $540_i$ may be marked as malicious if the association between the malicious $VM_n$ $540_n$ and the associated $VM_i$ $540_i$ meets certain prerequisites (e.g. if the associated $VM_i$ $540_i$ caused the instantiation of the malicious $VM_n$ $540_n$).

The arrangement of FIG. 5 may assist in identifying a kill chain of detected malware.

In some examples, the requesting $VM_i$ $540_i$ is marked as malicious if the association between the requesting $VM_i$ $540_i$ and the new $VM_n$ $540_n$ indicates that the new $VM_n$ $540_n$ is a child of the requesting $VM_i$ $540_i$.

In some examples, prior to the indication that the new $VM_n$ $540_n$ is malicious, the VM management circuitry 530 is to receive a further notification from the VM indicating that the VM requests instantiation of a further new VM. In response to the request the VM management circuitry 530 is to instantiate the further new VM and log an identifier of the further new VM and log an association between the $VM_i$ $540_i$ and the further new VM. The new $VM_n$ $540_n$ and the further new VM may each be child VMs of the requesting $VM_i$ $540_i$. In some examples, in response to the indication that the new $VM_n$ $540_n$ is malicious, when the further new VM is not marked as malicious, the VM management circuitry 530 may leave the further new VM marked as not malicious. In some examples this may avoid incorrectly marking VMs as malicious.

In some examples, in response to receiving the notification, the VM management circuitry 530 may identify, based on logged identifiers of VMs and logged associations between the VMs, an initial $VM_0$ $540_0$ among the VMs, wherein the initial $VM_0$ $540_0$ has an association with the new $VM_n$ $540_n$ (e.g. the initial $VM_0$ $540_0$ and new $VM_n$ $540_n$ are in the same chain or family of VMs, such that initial $VM_0$ $540_0$ is an ancestor VM of the new $VM_n$ $540_n$), and wherein the initial $VM_0$ $540_0$ is instantiated in response to an attempted file or URL access in a host operating system of the computing device 500. In some examples, in response to identifying the initial $VM_0$ $540_0$, the VM management circuitry 530 may identify the file or URL (i.e. the file or URL that was accessed to cause the instantiation of the initial $VM_0$ $540_0$). Further, in some examples, in response to identifying the file or URL, the file or URL may be marked as malicious.

An initial VM may be a first VM or a starting VM that begins a chain of VMs.

The association between the initial $VM_0$ $540_0$ and the new $VM_n$ $540_n$ (i.e. the VM that is determined to be malicious) may be indirect. For example, the new $VM_n$ $540_n$ may be an ancestor VM of the initial $VM_0$ $540_0$, possibly with intervening VMs (e.g. $VM_i$ $540_i$), such that the new $VM_n$ $540_n$ is not the child VM of the initial $VM_0$ $540_0$. In some examples the association may be direct, e.g. the new $VM_n$ $540_n$ may be a child VM of the initial $VM_0$ $540_0$.

In some examples the initial VM may be determined by the VM management circuitry 530 using the logged information to trace successive parent VMs from the new $VM_n$ $540_n$ to the initial $VM_0$ $540_0$. In some examples, the logged information my directly relate the new $VM_n$ $540_n$ with the initial $VM_0$ $540_0$, e.g. by including in a record describing the new $VM_n$ $540_n$ a list of all its ancestor VMs. In some examples, a record associated with each VM may include an indication of its initial $VM_0$ $540_0$.

Determining an initial $VM_0$ $540_0$ that was instantiated in response to an attempted file or URL access in a host operating system may allow identification of the initial file or URL that led to the deployment of the malware. This file or URL may be the root cause of the malware deployment. By marking the file or URL as malicious, the likelihood of further deployment of the malware may be reduced.

In some examples, the VM may include a plurality of browser tabs and the request for instantiation of the new VM may originate from a particular browser tab of the plurality of browser tabs. The identifier of the VM may include an identification of the particular browser tab. This may facilitate determination of which browser tabs are part of the kill chain and which browser tabs are not.

In some examples, the information 135 describing a chain of VMs, the relationship information 235, VM database 370, description 470 of the chain of VMs, or log 570 may be used to generate a report describing the kill chain. This report may assist a user in analyzing the malware.

References herein to instructions may describe any suitable form of computer-readable instructions that may be executed by a processor. For example, the code may be implemented in software, firmware, or a combination of these.

A computer-readable storage medium may be any electronic, magnetic, optical, or other physical storage device that contains or stores executable instructions. Computer-readable storage medium may be, for example, Random Access Memory (RAM), an Electrically Erasable Programmable Read-Only Memory (EEPROM), a storage drive, a Compact Disc Read Only Memory (CD-ROM), and the like. As such, the computer-readable storage medium can be non-transitory. The term "non-transitory" does not encompass transitory propagating signals.

A processor may be, or include, a Central Processing Unit (CPU), Graphics Processing Unit (GPU), Embedded Controller (EC), microprocessor, etc. suitable for retrieval and execution of instructions, electronic circuits configured to perform the operations stored on computer-readable storage media, or a combination thereof. In some examples, the processor may include a plurality of processing elements.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context implies otherwise. In particular, where the indefinite article is used, the specification is to be understood as contemplating plurality as well as singularity, unless the context implies otherwise.

Features, integers, characteristics, etc. described in conjunction with a particular aspect or example are to be understood to be applicable to any other aspect or example described herein unless incompatible therewith. All of the features disclosed in this specification (including any accompanying claims, abstract, and drawings), and all of the operations of any method or process so disclosed, may be combined in any combination, except combinations where at least some of such features or operations are mutually exclusive. Examples are not restricted to the details of any foregoing examples. The Examples may extend to any novel one, or any novel combination, of the features disclosed in this specification (including any accompanying claims, abstract, and drawings), or to any novel one, or any novel combination, of the operations of any method or process so disclosed.

The reader's attention is directed to all papers and documents which are filed concurrently with or previous to this specification in connection with this application and which are open to public inspection with this specification, and the contents of all such papers and documents are incorporated herein by reference.

Example implementations can also be realized according to the following examples:

Example 1: A non-transitory computer-readable storage medium storing thereon instructions that, when executed, cause a processor of a computing device to: receive an indication associated with a first virtual machine, the first virtual machine containing a first application, the indication indicating that a first operation in the first virtual machine is to use a second application; receive information associated with a second virtual machine, the second virtual machine created in response to the first operation and containing the second application; store information describing a chain of virtual machines, the chain of virtual machines including the first and second virtual machines, the stored information including a relationship between the first virtual machine and the second virtual machine, based on the received indication and the received information; and in response to an identification of malware in the chain of virtual machines, identify a particular virtual machine in the chain of virtual machines that is in a kill chain of the malware based on the stored information.

Example 2: The non-transitory computer-readable storage medium of example 1, wherein the first virtual machine is a primary virtual machine and other virtual machines in the chain of virtual machines are secondary virtual machines, wherein a secondary virtual machine is created in response to an operation in a respective preceding virtual machine in the chain of virtual machines, wherein the stored information stores information on a relationship between a secondary virtual machine and the respective preceding virtual machine.

Example 3: The non-transitory computer-readable storage medium of example 2, wherein the instructions, when executed, further cause the processor to: identify the malware in a virtual machine in the chain of virtual machines, in response to the identification of the malware in the virtual machine, flag the virtual machine as malicious, and when a secondary virtual machine is flagged as malicious, determine that its respective preceding virtual machine is in the kill chain of the malware, and flag that preceding virtual machine as malicious.

Example 4: The non-transitory computer-readable storage medium of example 3, wherein when a particular secondary virtual machine is not flagged as malicious, the particular secondary virtual machine is not flagged as malicious in response to its respective preceding virtual machine being flagged as malicious.

Example 5: The non-transitory computer-readable storage medium of any one of examples 2-4, wherein the instructions, when executed, further cause the processor to; identify a file or uniform resource locator (URL) opened in the primary virtual machine; and flag the identified file or URL as malicious.

Example 6: A non-transitory computer-readable storage medium storing thereon instructions that, when executed, cause a processor of a computing device to: record a description of a chain of virtual machines, the chain of virtual machines including n virtual machines, the n virtual machines including a starting virtual machine and n−1 child virtual machines, the child virtual machines associated with a respective parent virtual machine among the n virtual machines, wherein a child virtual machine is instantiated in response to an event in the respective parent virtual machine, wherein the description of the chain of virtual machines includes parent and child relationships between the virtual machines; receive information regarding a further child virtual machine instantiated in response to an event in a virtual machine of the n virtual machines; update the description of the chain of virtual machines to include the further child virtual machine; receive a notification of an infected virtual machine, the infected virtual machine being a virtual machine in the chain of virtual machines that is identified as containing malware; and determine other virtual machines in the chain of virtual machines to be identified as malicious based on the notification and based on the description of the chain of virtual machines.

Example 7: The non-transitory computer-readable storage medium of example 6, wherein the event in a parent virtual machine that causes the respective child virtual machine to be instantiated is a request to use an application that is not available in the parent virtual machine but is available in the respective child virtual machine.

Example 8: The non-transitory computer-readable storage medium of example 6 or example 7, wherein the instructions, when executed, further cause the processor to: set an indication that the infected virtual machine is malicious; wherein determining other virtual machines in the chain of virtual machines to be identified as malicious includes setting respective indications that parent virtual machines in a direct chain linking the infected virtual machine with the starting virtual machine are malicious.

Example 9: The non-transitory computer-readable storage medium of any one of examples 6-8, wherein the instructions, when executed, further cause the processor to: identify a file or URL as malicious, wherein an access to the file or uniform resource locator (URL) cased the instantiation of the starting virtual machine in the chain of virtual machines.

Example 10: The non-transitory computer-readable storage medium of any one of examples 6-9, wherein the instructions, when executed, further cause the processor to: maintain the record until all virtual machines in the chain of virtual machines are closed.

Example 11: A computing device comprising: a processing device; a memory; and virtual machine management circuitry to instantiate and manage virtual machines, wherein the virtual machine management circuitry to: receive a notification from a virtual machine when the virtual machine requests instantiation of a new virtual machine, the notification including an identifier of the virtual machine, log the identifier of the virtual machine, instantiate the new virtual machine, log an identifier of the new virtual machine and log an association between the virtual machine and the new virtual machine, receive an indication from malware detection circuitry that the new virtual machine is malicious, and mark the virtual machine and the new virtual machine as malicious, based on the logged identifier of the virtual machine, the logged identifier of the new virtual machine, and the logged association.

Example 12: The computing device of example 11, wherein the association between the virtual machine and the new virtual machine indicates that the new virtual machine is a child of the virtual machine.

Example 13: The computing device of example 11 or example 12, wherein the virtual machine management circuitry is to, prior to the indication that the new virtual machine is malicious: receive a further notification from the virtual machine indicating that the virtual machine requests instantiation of a further new virtual machine, instantiate the further new virtual machine, log an identifier of the further new virtual machine and log an association between the virtual machine and the further new virtual machine, and in response to the indication that the new virtual machine is malicious and when the further new virtual machine is not marked as malicious, leave the further new virtual machine marked as not malicious.

Example 14: The computing device of any one of examples 11 to 13, wherein the virtual machine management circuitry is to, in response to receiving the notification: identity, based on logged identifiers of virtual machines and logged associations between the virtual machines, an initial virtual machine among the virtual machines, wherein the initial virtual machine has an association with the new virtual machine, and wherein the initial virtual machine is instantiated in response to an attempted file or uniform resource locator (URL) access in a host operating system of the computing device; identify the file or URL; and mark the file or URL as malicious.

Example 15: The computing device of any one of examples 11-14, wherein the virtual machine includes a plurality of browser tabs and the request for instantiation of the new virtual machine originates from a particular browser tab of the plurality of browser tabs, and the identifier of the virtual machine includes an identification of the particular browser tab.

The invention claimed is:

1. A non-transitory computer-readable storage medium storing thereon instructions that, when executed, cause a processor of a computing device to:
receive an indication associated with a first virtual machine, the first virtual machine containing a first application, the indication indicating that a first operation in the first virtual machine is to use a second application;
receive information associated with a second virtual machine, the second virtual machine created in response to the first operation and containing the second application;
store information describing a chain of virtual machines, the chain of virtual machines including the first and second virtual machines, the stored information including a relationship between the first virtual machine and the second virtual machine, based on the received indication and the received information; and
in response to an identification of malware in the chain of virtual machines, identify a particular virtual machine in the chain of virtual machines that is in a kill chain of the malware based on the stored information,
wherein the first virtual machine is a primary virtual machine and other virtual machines in the chain of virtual machines are secondary virtual machines, wherein a secondary virtual machine is created in response to an operation in a respective preceding virtual machine in the chain of virtual machines, wherein the stored information stores information on a relationship between a secondary virtual machine and the respective preceding virtual machine,
wherein the instructions, when executed, further cause the processor to:
identify the malware in a virtual machine in the chain of virtual machines,
in response to the identification of the malware in the virtual machine, flag the virtual machine as malicious, and
when a secondary virtual machine is flagged as malicious, determine that its respective preceding virtual machine is in the kill chain of the malware, and flag that preceding virtual machine as malicious.

2. The non-transitory computer-readable storage medium of claim 1, wherein when a particular secondary virtual machine is not flagged as malicious, the particular secondary virtual machine is not flagged as malicious in response to its respective preceding virtual machine being flagged as malicious.

3. The non-transitory computer-readable storage medium of claim 1, wherein the instructions, when executed, further cause the processor to:
identify a file or uniform resource locator (URL) opened in the primary virtual machine; and
flag the identified file or URL as malicious.

4. A non-transitory computer-readable storage medium storing thereon instructions that, when executed, cause a processor of a computing device to:
record a description of a chain of virtual machines, the chain of virtual machines including n virtual machines, the n virtual machines including a starting virtual machine and n−1 child virtual machines, the child virtual machines associated with a respective parent virtual machine among the n virtual machines, wherein a child virtual machine is instantiated in response to an event in the respective parent virtual machine, wherein the description of the chain of virtual machines includes parent and child relationships between the virtual machines;

receive information regarding a further child virtual machine instantiated in response to an event in a virtual machine of the n virtual machines;

update the description of the chain of virtual machines to include the further child virtual machine;

receive a notification of an infected virtual machine, the infected virtual machine being a virtual machine in the chain of virtual machines that is identified as containing malware; and determine other virtual machines in the chain of virtual machines to be identified as malicious based on the notification and based on the description of the chain of virtual machines; and set an indication that the infected virtual machine is malicious;

wherein determining other virtual machines in the chain of virtual machines to be identified as malicious includes setting respective indications that parent virtual machines in a direct chain linking the infected virtual machine with the starting virtual machine are malicious.

5. The non-transitory computer-readable storage medium of claim 4, wherein the event in a parent virtual machine that causes the respective child virtual machine to be instantiated is a request to use an application that is not available in the parent virtual machine but is available in the respective child virtual machine.

6. The non-transitory computer-readable storage medium of claim 4, wherein the instructions, when executed, further cause the processor to:

identify a file or uniform resource locator (URL) as malicious, wherein an access to the file or URL cased the instantiation of the starting virtual machine in the chain of virtual machines.

7. The non-transitory computer-readable storage medium of claim 4, wherein the instructions, when executed, further cause the processor to:

maintain the record until all virtual machines in the chain of virtual machines are closed.

8. A computing device comprising:

a processing device;

a memory; and virtual machine management circuitry to instantiate and manage virtual machines, wherein the virtual machine management circuitry to:

receive a notification from a virtual machine when the virtual machine requests instantiation of a new virtual machine, the notification including an identifier of the virtual machine, log the identifier of the virtual machine, instantiate the new virtual machine, log an identifier of the new virtual machine and log an association between the virtual machine and the new virtual machine, receive an indication from malware detection circuitry that the new virtual machine is malicious, and mark the virtual machine and the new virtual machine as malicious, based on the logged identifier of the virtual machine, the logged identifier of the new virtual machine, and the logged association, wherein the virtual machine management circuitry is to, prior to the indication that the new virtual machine is malicious:

receive a further notification from the virtual machine indicating that the virtual machine requests instantiation of a further new virtual machine, instantiate the further new virtual machine, log an identifier of the further new virtual machine and log an association between the virtual machine and the further new virtual machine, and in response to the indication that the new virtual machine is malicious and when the further new virtual machine is not marked as malicious, leave the further new virtual machine marked as not malicious.

9. The computing device of claim 8, wherein the association between the virtual machine and the new virtual machine indicates that the new virtual machine is a child of the virtual machine.

10. The computing device of claim 8, wherein the virtual machine management circuitry is to, in response to receiving the notification:

identify, based on logged identifiers of virtual machines and logged associations between the virtual machines, an initial virtual machine among the virtual machines, wherein the initial virtual machine has an association with the new virtual machine, and wherein the initial virtual machine is instantiated in response to an attempted file or uniform resource locator (URL) access in a host operating system of the computing device;

identify the file or URL; and mark the file or URL as malicious.

11. The computing device of claim 8, wherein the virtual machine includes a plurality of browser tabs and the request for instantiation of the new virtual machine originates from a particular browser tab of the plurality of browser tabs, and the identifier of the virtual machine includes an identification of the particular browser tab.

* * * * *